US011301078B2

(12) United States Patent
Liang (10) Patent No.: US 11,301,078 B2
(45) Date of Patent: Apr. 12, 2022

(54) METHOD FOR PRESSURE CALCULATION AND APPARATUS THEREOF, ELECTRONIC DEVICE AND TOUCH SYSTEM (71) Applicant: SHENZHEN GOODIX TECHNOLOGY CO., LTD., Shenzhen (CN)

(72) Inventor: Qiquan Liang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 27 days.

(21) Appl. No.: 16/818,369

(22) Filed: Mar. 13, 2020

(65) Prior Publication Data
US 2020/0241720 A1 Jul. 30, 2020

Related U.S. Application Data (63) Continuation of application No. PCT/CN2019/073721, filed on Jan. 29, 2019.

(51) Int. Cl.
G06F 3/041 (2006.01)
(52) U.S. Cl.
CPC .............................. G06F 3/04142 (2019.05)
(58) Field of Classification Search
CPC ............. G06F 3/04142; G06F 3/04166; G06F 3/04162; G06F 3/03545
See application file for complete search history.

(56) References Cited

U.S. PATENT DOCUMENTS

| 2011/0193776 | A1* | 8/2011 | Oda ................... G06F 3/03545 |
| | | | 345/157 |
| 2012/0223911 | A1* | 9/2012 | Westhues .............. G06F 3/0446 |
| | | | 345/174 |
| 2017/0344174 | A1 | 11/2017 | Pant et al. |
| 2019/0294310 | A1* | 9/2019 | Lee ................... G06F 3/041662 |
| 2020/0285366 | A1* | 9/2020 | Agari .................. G06F 3/04142 |

FOREIGN PATENT DOCUMENTS

| CN | 102147675 A | 8/2011 |
| CN | 107278285 A | 10/2017 |
| CN | 206649490 U | 11/2017 |
| EP | 2354909 A2 | 8/2011 |
| EP | 3637231 | 4/2020 |
| WO | 2015182222 A1 | 12/2015 |
| WO | 2015182222 A1 | 6/2017 |

* cited by examiner

Primary Examiner — Amit Chatly
(74) Attorney, Agent, or Firm — Emerson, Thomson & Bennett, LLC; Roger D. Emerson (57) ABSTRACT A method for pressure calculation and an apparatus thereof, an electronic device and a touch system are provided. The method for pressure calculation includes: sampling, within a preset sampling period, a phase-encoded driving signal that is continuously provided to obtain a sampled driving signal; and calculating pressure data within the sampling period according to a phase difference between adjacent frames of the sampled driving signal within the sampling period. By using the method for pressure calculation, a report rate is increased, handwriting follow ability is further improved, and handwriting experience is improved.

15 Claims, 5 Drawing Sheets

METHOD FOR PRESSURE CALCULATION AND APPARATUS THEREOF, ELECTRONIC DEVICE AND TOUCH SYSTEM

CROSS-REFERENCE TO RELATED APPLICATION

This application is a continuation of International Application No. PCT/CN2019/073721, filed on Jan. 29, 2019, the application of which is hereby incorporated by reference in its entirety.

TECHNICAL FIELD

Embodiments of the present disclosure relate to the field of touch technologies, and more particularly, to a method for pressure calculation and an apparatus thereof, an electronic device and a touch system.

BACKGROUND

Touch input replaces traditional keyboard input, which provides users with a convenient and fast input mode when using electronic devices such as mobile phones and tablet computers.

In addition to directly performing touch operation on touch screens with hands, in order to further improve user experiences, styli may be employed to perform touch operation on the touch screens. Especially with the popularity of the touch screens, the applications of the styli in coordination with the touch screens also become more and more widespread. The report rate is an important indicator of effective interaction between the styli and the touch screens. The higher the report rate is, the better and the more fluent the handwriting follow ability is, and the better the handwriting experience is. However, in the existing technologies, when a driving signal is generated, the driving period occupies the sampling period too long, which results in a lower report rate and poorer handwriting follow ability.

SUMMARY

On this account, one of technical problems to be solved by embodiments of the present disclosure is to provide a method for pressure calculation and an apparatus thereof, an electronic device and a touch system to overcome the above defects in the existing technologies.

The embodiments of the present disclosure provide a method for pressure calculation, which includes:

sampling, within a preset sampling period, a phase-encoded driving signal that is continuously provided to obtain a sampled driving signal; and calculating pressure data within the sampling period according to a phase difference between adjacent frames of the sampled driving signal within the sampling period.

The embodiments of the present disclosure provide a method for signal generation, which includes:

performing phase encoding on a to-be-encoded driving signal to generate a driving signal; and continuously driving using the driving signal according to a preset driving period.

The driving signal is adapted to be sampled to obtain a sampled driving signal so as that pressure data within a sampling period is calculated according to a phase difference between adjacent frames of the sampled driving signal within the sampling period.

The embodiments of the present disclosure provide an apparatus for pressure calculation, which includes:

a data sampling unit, configured to sample, within a preset sampling period, a phase-encoded driving signal that is continuously provided to obtain a sampled driving signal; and a pressure calculating unit, configured to calculate pressure data within the sampling period according to a phase difference between adjacent frames of the sampled driving signal within the sampling period.

The embodiments of the present disclosure provide an apparatus for signal generation, which includes:

an encoding unit, configured to perform phase encoding on a to-be-encoded driving signal to generate a driving signal; and a driving unit, configured to continuously drive using the driving signal according to a preset driving period.

The driving signal is adapted to be sampled to obtain a sampled driving signal so as that pressure data within a sampling period is calculated according to a phase difference between adjacent frames of the sampled driving signal within the sampling period.

The embodiments of the present disclosure provide an electronic device, which includes the apparatus for pressure calculation or the apparatus for signal generation according to the embodiments of the present disclosure.

The embodiments of the present disclosure provide a touch system, which includes a stylus and a touch screen. One of the stylus and the touch screen includes the apparatus for signal generation according to any of the embodiments of the present disclosure, and the other of the stylus and the touch screen includes the apparatus for pressure calculation according to any of the embodiments of the present disclosure.

In technical solutions provided by the embodiments of the present disclosure, a sampled driving signal is obtained by sampling, within a preset sampling period, a phase-encoded driving signal that is continuously provided; and pressure data within the sampling period are calculated according to a phase difference between adjacent frames of the sampled driving signal within the sampling period. In this way, a report rate is increased, handwriting follow ability is further improved, and handwriting experience is improved.

BRIEF DESCRIPTION OF THE DRAWINGS

Some specific embodiments among the embodiments of the present disclosure will be described in detail hereinafter with reference to the accompanying drawings in an exemplary and non-restrictive way. The same reference numerals in the accompanying drawings indicate the same or similar components or parts. Those skilled in the art should understand that these accompanying drawings are not necessarily drawn to scale. In the drawings.

DETAILED DESCRIPTION OF THE EMBODIMENTS

Any technical solution for implementing the embodiments of the present disclosure does not necessarily have all the foregoing advantages simultaneously.

Concrete implementation of the embodiments of the present disclosure is further described below with reference to the embodiments of the present disclosure.

In the technical solutions provided by the embodiments of the present disclosure, a sampled driving signal is obtained by sampling, within a preset sampling period, a phase-encoded driving signal that is continuously provided; and pressure data within the sampling period are calculated according to a phase difference between adjacent frames of the sampled driving signal within the sampling period. The driving period is shortened because coordinate calculation and pressure calculation may be carried out simultaneously based on encoding for pressure and coordinate calculation. Correspondingly, it is avoided that the driving period occupies the sampling period too long. Therefore, a report rate is increased, handwriting follow ability is further improved, and handwriting experience is improved.

Figure 1:
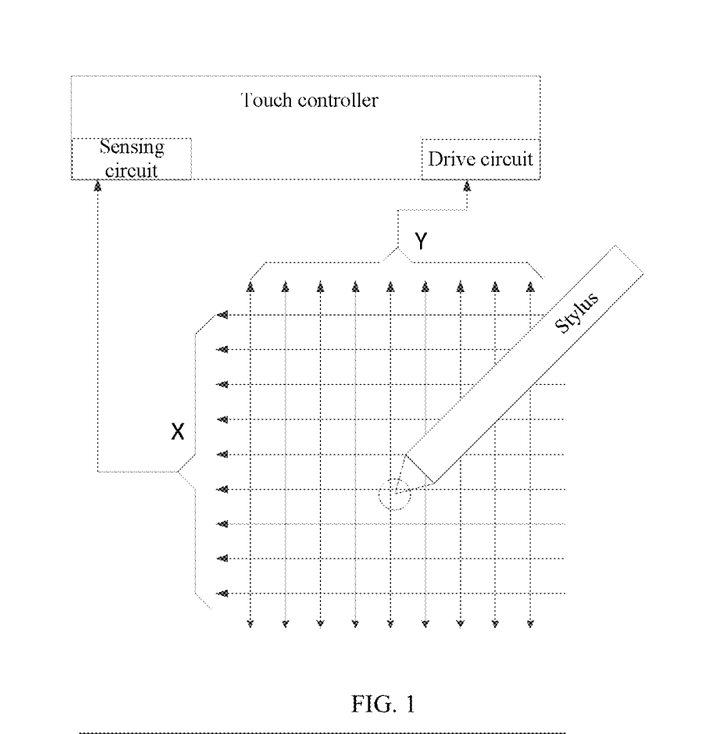
FIG. 1 is a schematic diagram of a touch system according to Embodiment I of the present disclosure.

FIG. 1 is a schematic diagram of a touch system according to Embodiment I of the present disclosure. As shown in FIG. 1, the touch system includes a stylus and a touch screen. The touch screen includes a sensing channel X, a drive channel Y, and a touch controller. The touch controller includes a drive circuit and a sensing circuit. When the touch screen detects a nib coordinate position of the stylus, a nib electrode of the stylus continuously sends an encoded driving signal. Because there is a coupling capacitor between the stylus and the sensing channel X and there is a coupling capacitor between the stylus and the drive channel Y, the driving signal is coupled to the sensing channel X and the drive channel Y through the coupling capacitor. At this moment, both the drive channel and the sensing channel of the touch screen may be connected to the sensing circuit of the touch controller. The sensing circuit of the touch controller may sample the driving signal to calculate pressure data within the sampling period according to a phase difference between adjacent frames of the sampled driving signal within the sampling period.

In the following embodiments, reference is made by taking an example where the stylus sends a driving signal to the touch screen, and the touch screen samples the driving signal. However, it is to be noted that in some application scenarios, the touch screen may send a driving signal to the stylus, and the stylus samples the driving signal.

Figure 2:
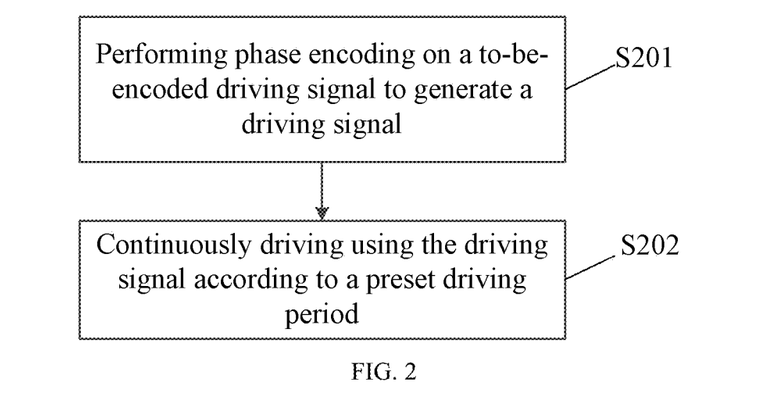
FIG. 2 is a schematic flow diagram of a method for signal generation according to Embodiment II of the present disclosure.

FIG. 2 is a schematic flow diagram of a method for signal generation according to Embodiment II of the present disclosure. As shown in FIG. 2, in this embodiment, the method for signal generation includes:

S201: performing phase encoding on a to-be-encoded driving signal according to driving protocols to generate a driving signal.

In Step S201, when encoding is performed, a phase difference is provided between adjacent frames of driving signal within each driving period according to a preset step phase.

In this embodiment, the driving signal within one driving period includes multiple frames of driving signal, and the phase difference between two adjacent frames of driving signal has a preset step phase. The multiple frames of driving signal include n frames of coordinate driving signal and m frames of pressure driving signal, wherein n is greater than or equal to 2, and m is greater than or equal to 0.

Alternatively, in any embodiment of the present disclosure, the step phase for the phase difference between two adjacent frames of driving signal may be 45 degrees, 90 degrees, or 180 degrees.

For example, the step phase preset within different driving periods remains unchanged, or the step phase may be preset to be dynamically adjustable. In the same driving period, the same step phase of two adjacent frames of driving signal may also be constant. For example, the step phase is 45 degrees, 90 degrees, or 180 degrees. The setting of the step phase is specifically determined according to the definition of a pressure grade in an application scenario. The closer the pressure grade is, the smaller the step phase is; and the looser the pressure grade is, the larger the step phase is. Of course, it is to be noted that the specific numerical value of the step phase here is an example and is not particularly limited. In some embodiments, the step phase may be 30 degrees.

In the description of the following embodiments, reference is made by taking an example where a phase of the first frame of driving signal is used as a reference phase, and the reference phase is 0. However, in some embodiments, if the reference phase is not 0, the following embodiments of the present disclosure may be adaptively adjusted.

S202: continuously driving using the driving signal according to a preset driving period.

Figure 3:
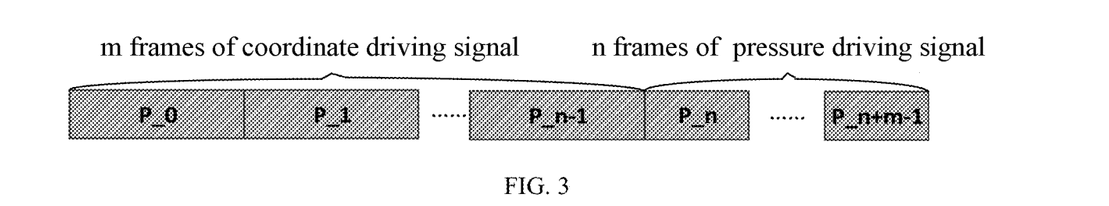
FIG. 3 is a schematic diagram of a driving signal according to Embodiment III of the present disclosure.

In this embodiment, referring to FIG. 3, a schematic diagram of a driving signal according to Embodiment III of the present disclosure is illustrated. The driving signal within one driving period includes multiple frames of driving signal, the phase difference between two adjacent frames of driving signal has a preset step phase, and the multiple frames of driving signal include n frames of coordinate driving signal and m frames of pressure driving signal. For example, the n frames of coordinate driving signal are continuous, and the m frames of pressure driving signal are continuous. The n frames of coordinate driving signal are prior to the m frames of pressure driving signal.

In fact, it is to be noted that here that the sampled driving signal involved in coordinate calculation is defined as a sampled coordinate driving signal, and the sampled driving signal involved in pressure calculation is defined as a sampled pressure driving signal. The naming here is merely comparative, and neither limits the sampled coordinate driving signal to be used only for coordinate calculation, nor limits the sampled pressure driving signal to be used only for pressure calculation. In fact, the sampled coordinate driving signal may be also involved in pressure calculation, or the sampled pressure driving signal may be also involved in coordinate calculation.

It is to be noted that the m frames of pressure driving signal are not necessarily continuous. Alternatively, according to requirements of the application scenarios, the n frames of coordinate driving signal may be interspersed with the pressure driving signal to form the mutually spaced m frames of pressure driving signal and the mutually spaced n frames of coordinate driving signal. In addition, the specific number of frames of the pressure driving signal and the coordinate driving signal may be flexibly set according to the requirements of the pressure grade. The higher the pressure grade is, the greater the number of frames is, and especially the greater the number of frames of the pressure driving signal is.

Figure 4A:
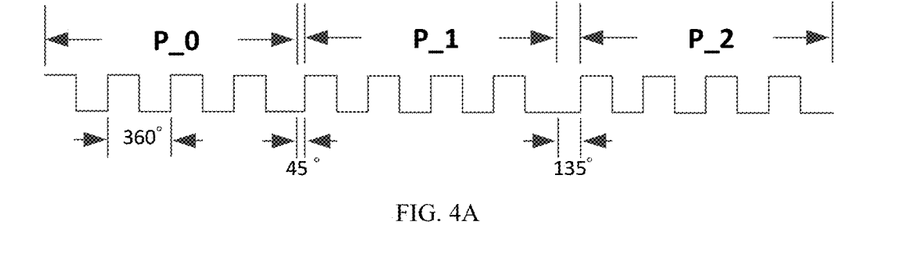
FIG. 4A is a waveform schematic diagram of a driving signal when a step phase is 45 degrees according to Embodiment IV of the present disclosure.

FIG. 4A is a waveform schematic diagram of a driving signal when a step phase is 45 degrees according to Embodiment IV of the present disclosure. As shown in FIG. 4A, the driving signal being a square wave corresponding to a 360-degree phase in one complete period is taken as an example, a P_1 frame of coordinate driving signal is not started until 45 degrees are delayed after a P_0 frame of coordinate driving signal, and a P_2 frame of coordinate driving signal is not started until 135 degrees are delayed after the P_1 frame of coordinate driving signal, and so on. Here, it is to be noted that the driving signal being a square wave is merely an example, and actually the driving signal may also be a sine wave signal or a triangular wave signal, etc.

Table I shows a schematic pressure mapping relationship when the step phase in FIG. 4A is 45 degrees. As shown in Table I, when the pressure mapping relationship is established, if a pressure state value P0 is denoted by the phase difference between the P_0 frame of coordinate driving signal and the P_1 frame of coordinate driving signal, based on the phase difference ranging from 0 degree to 315 degrees, the pressure state value P0 has eight types of pressure states in total, which are respectively denoted by 0, 1 . . . 7. Similarly, if a pressure state value P1 is denoted by the phase difference between the P_1 frame of coordinate driving signal and a P_2 frame of pressure driving signal, the pressure state value P1 has eight types of pressure states in total, which are respectively denoted by 0, 1 . . . 7, and so on.

TABLE I

Schematic Pressure Mapping Relationship When the Step phase In FIG. 4A is 45 Degrees

| Phase difference between P_0 and P_1 | Pressure state value of P0 | Phase difference between P_1 and P_2 | Pressure state value of P1 |
|---|---|---|---|
| 0 | 0 | 0 | 0 |
| 45 | 1 | 45 | 1 |
| 90 | 2 | 90 | 2 |
| 135 | 3 | 135 | 3 |
| 180 | 4 | 180 | 4 |
| 225 | 5 | 225 | 5 |
| 270 | 6 | 270 | 6 |
| 315 | 7 | 315 | 7 |

Figure 4B:
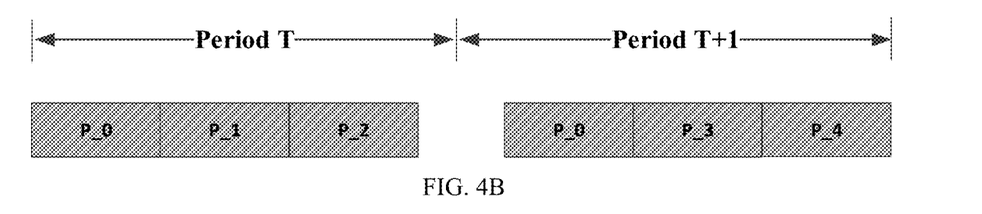
FIG. 4B is a schematic diagram of a specific driving signal when a step phase is 45 degrees according to Embodiment IV of the present disclosure.

FIG. 4B is a schematic diagram of a specific driving signal when a step phase is 45 degrees according to Embodiment IV of the present disclosure. As shown in FIG. 4B, if there are three frames of driving signal within one driving period (denoted as T), that is, P_0 and P_1 represent two frames of coordinate driving signal, and P_2 represents one frame of pressure driving signal. When the pressure mapping relationship is established, if a pressure state value P0 is denoted by the phase difference between the P_0 frame of coordinate driving signal and the P_1 frame of coordinate driving signal, based on the phase difference ranging from 45 degrees to 315 degrees, the pressure state value P0 has eight types of pressure states in total, which are respectively denoted by 0, 1 . . . 7. Similarly, if a pressure state value P1 is denoted by the phase difference between the P_1 frame of coordinate driving signal and the P_2 frame of coordinate driving signal, the pressure state value P1 has eight types of pressure states in total, which are respectively denoted by 0, 1 . . . 7, and so on. In another driving period (denoted as T+1), there are three frames of driving signal. That is, P_0 and P_3 represent two frames of coordinate driving signal, P_4 represents one frame of pressure driving signal, and the corresponding pressure state values are denoted by P2 and P3 respectively. In this case, the pressure state values P2 and P3 have eight types of pressure states respectively. If it is defined that effective magnitude of pressure can be outputted only once within two scanning periods, as can be seen, 4096 (8*8*8*8) types of pressure states may be generated in total. That is, transmission of 4096 pressure grades may be implemented.

Figure 4C:
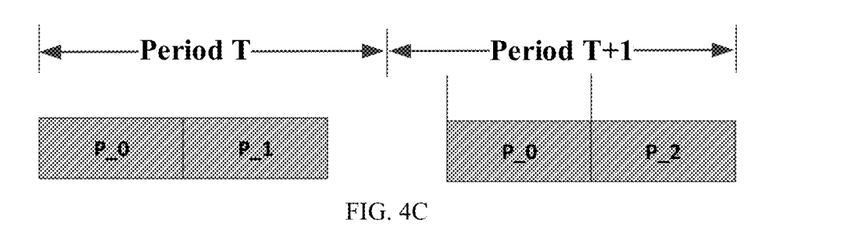
FIG. 4C is a schematic diagram of another specific driving signal when a step phase is 45 degrees.

FIG. 4C is a schematic diagram of another specific driving signal when a step phase is 45 degrees. If there are two frames of driving signal within one driving period (denoted as T), which respectively correspond to the above X-direction channel and Y-direction channel. That is, P_0 represents one frame of coordinate driving signal, and P_1 also represents one frame of coordinate driving signal. When the pressure mapping relationship is established, if a pressure state value P0 is denoted by the phase difference between the P_0 frame of coordinate driving signal and the P_1 frame of coordinate driving signal, based on the phase difference ranging from 0 degree to 315 degrees, the pressure state value P0 has eight types of pressure states in total, which are respectively denoted by 0, 1 . . . 7. The pressure state value corresponding to another driving period (denoted as T+1) is represented by P1, which also corresponds to eight types of pressure states. If it is defined that effective magnitude of pressure can be outputted only once within two scanning periods, as can be seen, 64 (8*8) types of pressure states may be generated in total. That is, transmission of 64 pressure grades may be implemented.

Figure 5A:
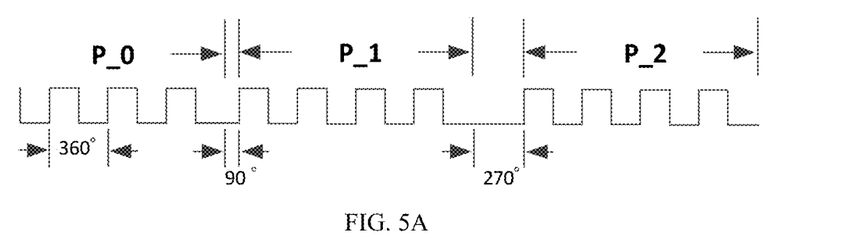
FIG. 5A is a waveform schematic diagram of a driving signal when a step phase is 90 degrees according to Embodiment V of the present disclosure.

FIG. 5A is a waveform schematic diagram of a driving signal when a step phase is 90 degrees according to Embodiment V of the present disclosure. As shown in FIG. 5A, the driving signal being a square wave is taken as an example, a P_1 frame of coordinate driving signal is not started until 90 degrees (i.e., 360 degrees/4) are delayed after a P_0 frame of coordinate driving signal, and a P_2 frame of coordinate driving signal is not started until 270 degrees (i.e., 360 degrees*¾) are delayed after the P_1 frame of coordinate driving signal, and so on. Here, it is to be noted that the driving signal being a square wave is merely an example, and actually the driving signal may also be a sine wave signal or a triangular wave signal, etc.

Table II shows a schematic pressure mapping relationship when the step phase in FIG. 5A is 90 degrees. As shown in Table II, when the pressure mapping relationship is established, if a pressure state value P0 is denoted by the phase difference between the P_0 frame of coordinate driving signal and the P_1 frame of coordinate driving signal, based on the phase difference ranging from 0 degree to 270 degrees, the pressure state value P0 has four types of pressure states in total, which are respectively denoted by 0, 1 . . . 3. Similarly, if a pressure state value P1 is denoted by the phase difference between the P_1 frame of coordinate driving signal and a P_2 frame of coordinate driving signal, the pressure state value P1 has four types of pressure states in total, which are respectively denoted by 0, 1 . . . 3; if a pressure state value P2 is denoted by the phase difference between a P_2 frame of pressure driving signal and a P_3 frame of pressure driving signal, the pressure state value P2 has four types of pressure states in total, which are respectively denoted by 0, 1 . . . 3, and so on.

TABLE II

Schematic Pressure Mapping Relationship When the Step phase In FIG. 5A is 90 Degrees

| Phase difference (°) between P_0 and P_1 | Pressure state value of P0 | Phase difference between P_1 and P_2 | Pressure state value of P1 |
|---|---|---|---|
| 0 | 0 | 0 | 0 |
| 90 | 1 | 90 | 1 |
| 180 | 2 | 180 | 2 |
| 270 | 3 | 270 | 3 |

Figure 5B:
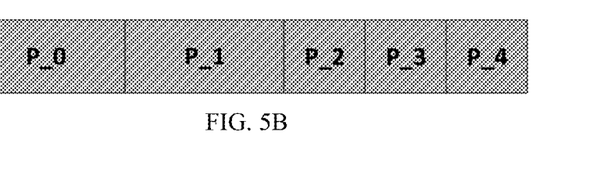
FIG. 5B is a schematic diagram of a specific driving signal when the step phase is 90 degrees according to Embodiment V of the present disclosure.

FIG. 5B is a schematic diagram of a specific driving signal when a step phase is 90 degrees according to Embodiment V of the present disclosure. If there are five frames of driving signal within one driving period, that is, P_0 and P_1 respectively represent one frame of coordinate driving signal, and P-2-P-4 respectively represent one frame of pressure driving signal. When the pressure mapping relationship is established, if a pressure state value P0 is denoted by the phase difference between the P_0 frame of coordinate driving signal and the P_1 frame of coordinate driving signal, based on the phase difference ranging from 0 degree to 270 degrees, the pressure state value P0 has four types of pressure states in total, which are respectively denoted by 0, 1 . . . 3. Similarly, if pressure state values P1, P2 and P3 are respectively denoted by the phase difference between the P_1 frame of coordinate driving signal and the P_2 frame of coordinate driving signal, the phase difference between the P_2 frame of coordinate driving signal and a P_3 frame of coordinate driving signal, the phase difference between the P_3 frame of coordinate driving signal and a P_4 frame of coordinate driving signal, the pressure state values corresponding to another driving period are denoted by P0, P1, P2 and P3, which also respectively correspond to four types of pressure states. If it is defined that effective magnitude of pressure can be outputted only once within one scanning period, as can be seen, 256 (4*4*4*4) types of pressure states may be generated in total. That is, transmission of 256 pressure grades may be implemented.

Figure 6A:
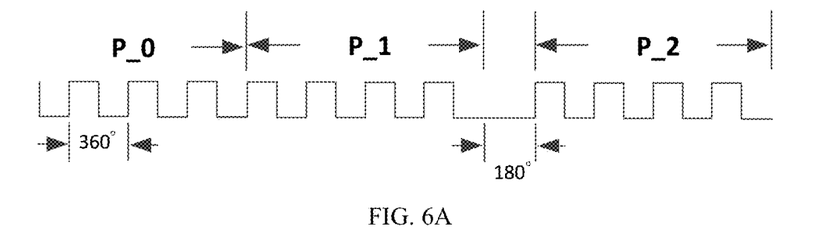
FIG. 6A is a waveform schematic diagram of a driving signal when a step phase is 180 degrees according to Embodiment VI of the present disclosure.

FIG. 6A is a waveform schematic diagram of a driving signal when a step phase is 180 degrees according to Embodiment VI of the present disclosure. As shown in FIG. 6A, the driving signal being a square wave is taken as an example, no delay exists between the P_0 frame of coordinate driving signal and the P_1 frame of coordinate driving signal, the P_2 frame of coordinate driving signal is not started until 180 degrees are delayed after the P_1 frame of coordinate driving signal, and so on. Here, it is to be noted that the driving signal being a square wave is merely an example, and actually the driving signal may also be a sine wave signal or a triangular wave signal, etc.

Table III shows a schematic pressure mapping relationship when the step phase in FIG. 6A is 180 degrees. As shown in Table III, when the pressure mapping relationship is established, if a pressure state value P0 is denoted by the phase difference between the P_0 frame of coordinate driving signal and the P_1 frame of coordinate driving signal, based on the phase difference ranging from 0 degree to 180 degrees, the pressure state value P0 has two types of pressure states in total, which are respectively denoted by 0 and 1. Similarly, if a pressure state value P1 is denoted by the phase difference between the P_1 frame of coordinate driving signal and the P_2 of frame coordinate driving signal, the pressure state value P1 has two types of pressure states in total, which are respectively denoted by 0 and 1.

TABLE III

Schematic Pressure Mapping Relationship When the Step phase In FIG. 6A is 180 Degrees

| Phase difference (°) between P_0 and P_1 | Pressure state value of P0 | Phase difference between P_1 and P_2 | Pressure state value of P1 |
|---|---|---|---|
| 0 | 0 | 0 | 0 |
| 180 | 1 | 180 | 1 |

Figure 6B:
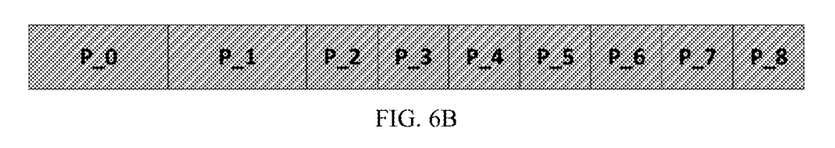
FIG. 6B is a schematic diagram of a specific driving signal when the step phase is 180 degrees according to Embodiment VI of the present disclosure.

FIG. 6B is a schematic diagram of a specific driving signal when a step phase is 180 degrees according to Embodiment VI of the present disclosure. If there are nine frames of driving signal within one driving period, that is, P_0 and P_1 respectively represent one frame of coordinate driving signal, and P_2-P_8 respectively represent one frame of pressure driving signal. When the pressure mapping relationship is established, if a pressure state value P0 is denoted by the phase difference between the P_0 frame of coordinate driving signal and the P_1 frame of coordinate driving signal, based on the phase difference ranging from 0 degree to 180 degrees, the pressure state value P0 has two types of pressure states in total, which are respectively denoted by 0 and 1. Similarly, pressure state values P1, P2, P3, P5, P6 and P7 are respectively denoted by the phase difference between the P_1 frame of coordinate driving signal and the P_2 frame of coordinate driving signal, the phase difference between the P_2 frame of coordinate driving signal and a P_3 frame of coordinate driving signal, the phase difference between the P_3 frame of coordinate driving signal and a P_4 frame of coordinate driving signal, and so on. If it is defined that effective magnitude of pressure can be outputted only once within one scanning period, as can be seen, 256 (2*2*2*2*2*2*2*2) types of pressure states may be generated in total. That is, transmission of 256 pressure grades may be implemented.

Figure 7:
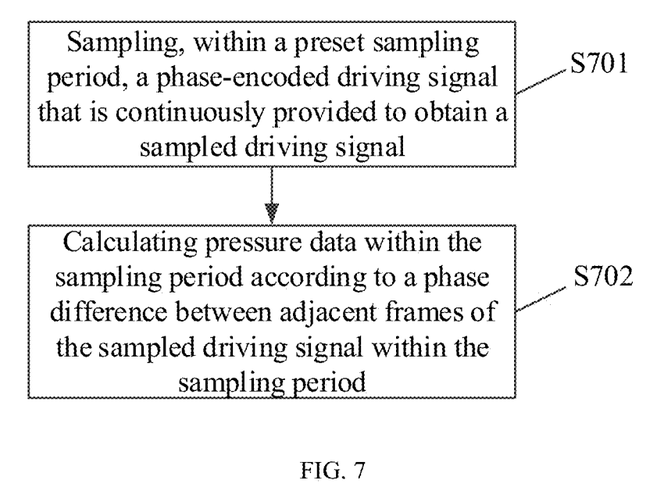
FIG. 7 is a schematic flow diagram of a method for pressure calculation according to Embodiment VII of the present disclosure.

FIG. 7 is a schematic flow diagram of a method for pressure calculation according to Embodiment VII of the present disclosure. As shown in FIG. 7, the method for pressure calculation includes:

S701: sampling, within a preset sampling period, a phase-encoded driving signal that is continuously provided to obtain a sampled driving signal.

In this embodiment, as previously mentioned, the sensing circuit of the touch screen may sample the driving signal. The sampling period may be flexibly set according to application scenarios, and specifically the driving signal may be obtained by referring to the previous embodiments of the method for signal generation.

S702: calculating pressure data within the sampling period according to a phase difference between adjacent frames of the sampled driving signal within the sampling period.

In this embodiment, when determining the pressure data between the stylus and the touch screen within the sampling period according to the sampled driving signal including at least a sampled coordinate signal in Step S702, specifically a pressure state value between the stylus and the touch screen within the sampling period may be determined according to the sampled driving signal including at least the sampled coordinate signal, wherein the pressure state value represents the magnitude of the pressure.

Further, with reference to the generation of the driving signal, the driving signal is obtained by encoding a to-be-encoded driving signal based on phase encoding. Therefore, when determining the magnitude of the pressure within the sampling period, the magnitude of the pressure within the sampling period is determined according to a phase corresponding to the sampled driving signal including at least the sampled coordinate signal.

Specifically, when determining the magnitude of the pressure within the sampling period according to the phase corresponding to the sampled driving signal including at least the sampled coordinate signal, adjacent differential may be performed on the phase corresponding to the sampled driving signal within the sampling period to determine the magnitude of the pressure within the sampling period.

Further, in this embodiment, when determining the pressure data within the sampling period according to the sampled driving signal including at least a sampled coordinate signal in Step S702, specifically the pressure data within the sampling period may be determined according to the phase difference between the adjacent frames of the sampled driving signal within the sampling period and a pre-established pressure mapping relationship. For example, the pre-established pressure mapping relationship may represent different pressure grades based on the phase difference between adjacent signals. In the pre-established pressure mapping relationship, for a step phase for setting the phase difference, different combinations of the phase difference between the adjacent frames within the sampling period represent different pressure grades. Therefore, the phase difference between adjacent frames of the sampled driving signal is determined within one sampling period, and the phase difference is matched with the pre-established pressure mapping relationship to determine the corresponding pressure grade (also referred to as pressure state value) as the pressure data.

Correspondingly, if continuous n frames of sampled coordinate signal and continuous m frames of sampled pressure signal are obtained by sampling, within a preset sampling period, a phase-encoded driving signal that is continuously provided, the n frames of sampled coordinate signal and the m frames of sampled pressure signal may constitute the sampled driving signal as a whole. Therefore, when calculating the pressure data within the sampling period, the pressure data between the stylus and the touch screen within the sampling period may be determined according to the phase difference between sampled signals having an adjacent relationship within one sampling period. That is, in this case, by extension, the n frames of sampled coordinate signal are continuous, the m frames of sampled pressure signal are continuous, and the n frames of sampled coordinate signal and the m frames of sampled pressure signal may constitute continuous multiple frames of sampled signal as a whole. When phase adjacent differential are performed, if n is greater than or equal to 2, the pressure data are calculated according to the phase difference between adjacent frames of sampled coordinate signal among the n frames of sampled coordinate signal as well as the phase difference between a sampled coordinate signal and a sampled pressure signal that are adjacent to each other among the n frames of sampled coordinate signal and of the m frames of sampled pressure signal. In addition, if m is greater than or equal to 2, the pressure data are calculated according to the phase difference between the adjacent frames of sampled pressure signal of the m frames of sampled pressure signal obtained by performing phase adjacent differential on the m frames of sampled pressure signal.

Based on the above embodiments, the method may further include: calculating a touch location according to the sampled coordinate signal. This step may be performed after Step S702, or may be performed between Step S701 and Step S702, or may be performed immediately after the sampled coordinate signal is obtained.

Figure 8A:
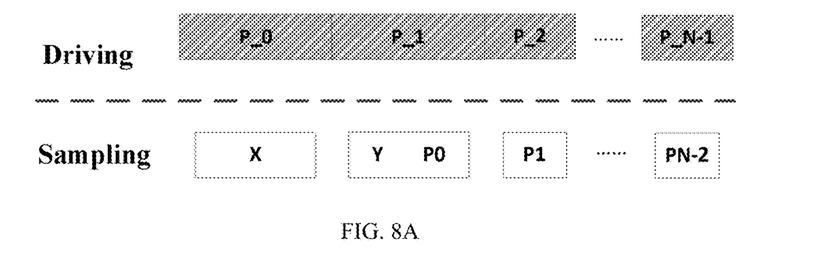
FIG. 8A is a schematic diagram showing comparison between a driving period and a sampling period when a corresponding step phase is 45 degrees according to Embodiment VIII of the present disclosure.

FIG. 8A is a schematic diagram showing comparison between a driving period and a sampling period when a corresponding step phase is 45 degrees according to Embodiment VIII of the present disclosure. In a driving case where the corresponding step phase is 45 degrees, as shown in FIG. 8A, during signal generation, a driving signal is obtained by performing phase encoding on a to-be-encoded driving signal according to a phase difference of 45 degrees within one driving period. During pressure calculation, the driving signal is sampled within one sampling period to obtain a sampled driving signal, coordinate data P0, . . . PN-1 are obtained according to the phase adjacent differential between adjacent frames of the sampled driving signal, and meanwhile coordinate data X and Y are obtained.

Figure 8B:
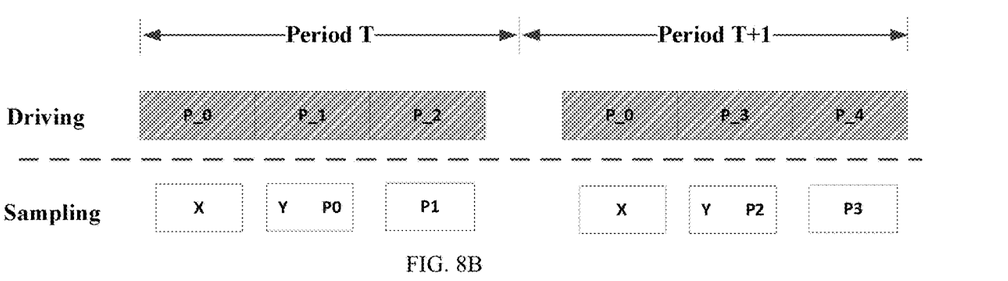
FIG. 8B is another schematic diagram showing comparison between a driving period and a sampling period when a corresponding step phase is 45 degrees according to Embodiment IX of the present disclosure.

FIG. 8B is another schematic diagram showing comparison between a driving period and a sampling period when a corresponding step phase is 45 degrees according to Embodiment IX of the present disclosure. In a driving case where the corresponding step phase is 45 degrees, as shown in FIG. 8B, during signal generation, a total of three frames of driving signal are obtained by performing phase encoding on a to-be-encoded driving signal according to a phase difference of 45 degrees within one driving period, i.e., two frames of coordinate driving signal and one frame of pressure driving signal. During pressure calculation, within one sampling period T, the driving signal is sampled to obtain a sampled coordinate signal and a sampled pressure signal, and pressure data P0 and P1 are obtained according to the phase adjacent differential between the sampled coordinate signal and the sampled pressure signal as well as the phase adjacent differential between the sampled pressure signals. If the magnitude of pressure is outputted once within two sampling periods, the pressure data P2 and P3 are obtained within the next sampling period T+1, and the magnitude of pressure is determined according to the pressure data P0, P1, P2 and P3; and meanwhile coordinate data X and Y are obtained according to the sampled coordinate signal.

In this embodiment, as described in the foregoing Table I, because one pressure data may correspond to eight types of pressure states, four pressure data may represent the magnitude of pressure of a total of 4096 (4*4*4*4) pressure grades.

Figure 8C:
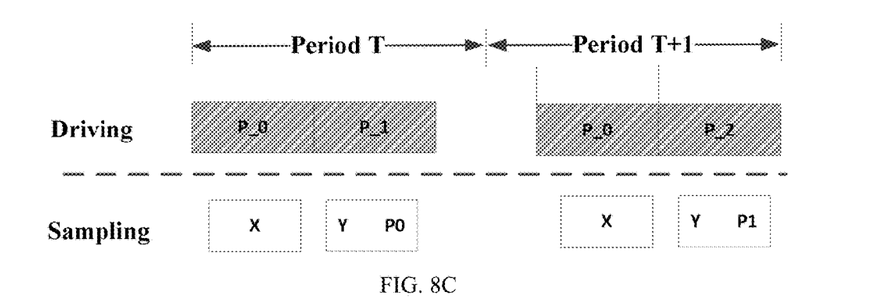
FIG. 8C is still another schematic diagram showing comparison between a driving period and a sampling period when a corresponding step phase is 45 degrees according to Embodiment X of the present disclosure.

FIG. 8C is still another schematic diagram showing comparison between a driving period and a sampling period when a corresponding step phase is 45 degrees according to Embodiment X of the present disclosure. In a driving case where the corresponding step phase is 45 degrees, as shown in FIG. 8C, during signal generation, a total of two frames of driving signal are obtained by performing phase encoding on a to-be-encoded driving signal according to a phase difference of 45 degrees within one driving period, wherein the two frames of driving signal both are coordinate driving signals. During pressure calculation, within one sampling period T, the driving signal is sampled to obtain a corresponding sampled coordinate signal, and pressure data P0 are obtained according to the phase adjacent differential between the sampled coordinate signals. If the magnitude of pressure is outputted once within two sampling periods, the pressure data P1 are obtained within the next sampling period T+1, and the magnitude of pressure is determined according to the pressure data P0 and P1; and meanwhile the coordinate data X and Y are obtained according to the sampled coordinate signals.

In this embodiment, as described in the previous Table I, one pressure data may correspond to eight types of pressure states. Therefore, if the magnitude of pressure is outputted once within two sampling periods, two pressure data may represent the magnitude of pressure of a total of 64 (8*8) pressure grades.

Figure 9:
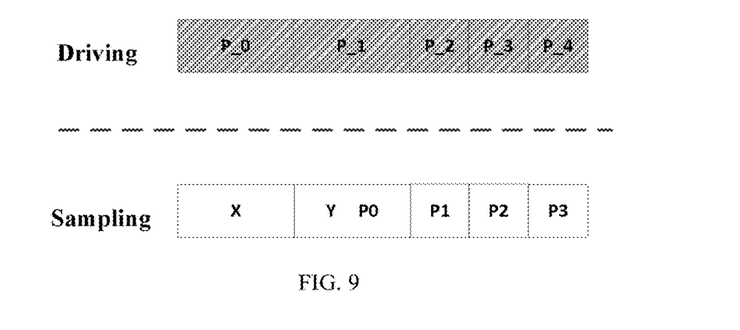
FIG. 9 is a schematic diagram showing comparison between a driving period and a sampling period when a corresponding step phase is 90 degrees according to Embodiment XI of the present disclosure.

FIG. 9 is a schematic diagram showing comparison between a driving period and a sampling period when a corresponding step phase is 90 degrees according to Embodiment XI of the present disclosure. In a driving case where the corresponding step phase is 90 degrees, as shown in FIG. 9, during signal generation, two frames of coordinate driving signal (P_0 and P_1) and two frames of pressure driving signal (P_2 and P_3) are obtained by performing phase encoding on a to-be-encoded driving signal according to a phase difference of 90 degrees within one driving period. During pressure calculation, within one sampling period, the driving signal is sampled to obtain a sampled coordinate signal and a sampled pressure signal, and pressure data P0, P1 and P2 are obtained according to the phase adjacent differential between the sampled coordinate signal and the sampling pressure sampled signal as well as the phase adjacent differential between the sampled pressure signals, and meanwhile the coordinate data X and Y are obtained according to the sampled coordinate signal.

In this embodiment, as described in the previous Table II, one pressure data may correspond to four types of pressure states. Therefore, if the magnitude of pressure is outputted once within one sampling period, three pressure data may represent the magnitude of pressure of a total of 64 (4*4*4) pressure grades.

Figure 10:
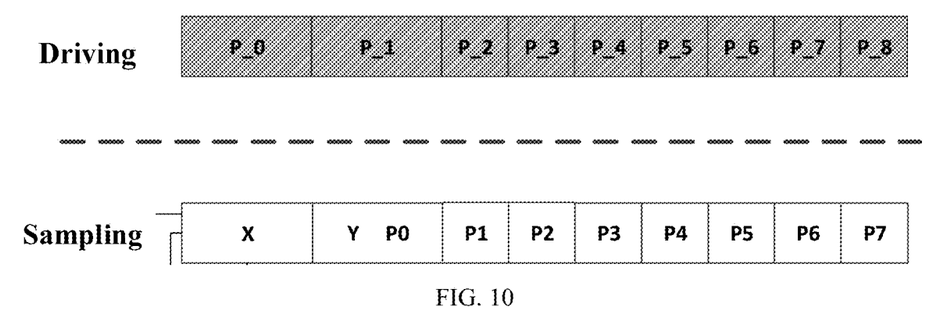
FIG. 10 is a schematic diagram showing comparison between a driving period and a sampling period when a corresponding step phase is 180 degrees according to Embodiment XII of the present disclosure.

FIG. 10 is a schematic diagram showing comparison between a driving period and a sampling period when a corresponding step phase is 180 degrees according to Embodiment XII of the present disclosure. In a driving case where the corresponding step phase is 180 degrees, as shown in FIG. 10, during signal generation, two frames of coordinate driving signal (P_0 and P_1) and two frames of pressure driving signal (P_2, P_3 ... P_8) are obtained by performing phase encoding on a to-be-encoded driving signal according to a phase difference of 180 degrees within one driving period. During pressure calculation, within one sampling period, the driving signal is sampled to obtain a sampled driving signal, and pressure data P0, P1, P2 ... P7 are obtained according to the phase adjacent differential between the sampled coordinate signal and the sampled pressure signal as well as the phase adjacent differential between the sampled pressure signals, and meanwhile the coordinate data X and Y are obtained according to the sampled coordinate signal.

In this embodiment, as described in the previous Table III, one pressure data may correspond to two types of pressure states. Therefore, if the magnitude of pressure is outputted once within one sampling period, three pressure data may represent the magnitude of pressure of a total of 256 (2*2*2*2*2*2*2*2) pressure grades.

In the above FIG. 8A to FIG. 10, when requirements for synchronization of driving and sampling are not high, a sampling start point and a sampling end point may be adjusted within one sampling period. For example, the entire sampling period is ensured to be smaller than the driving period, for example, the sampling start point is several us (for example, 50 us) later than a driving start point, and the sampling end point is several us (for example, 50 us) earlier than a driving end point.

In the above embodiments, each pressure state data may be represented by a bit. The width of the pressure driving signal and the width of the coordinate driving signal may be flexibly set according to actual needs. The length of the driving period and the length of the sampling period may be flexibly set according to actual needs.

Figure 11:
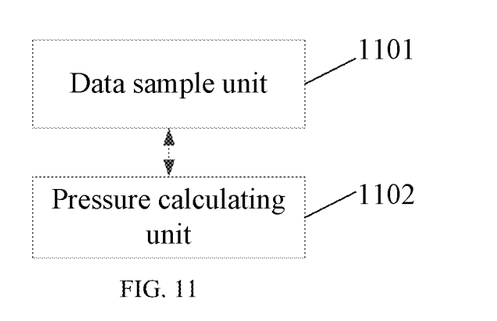
FIG. 11 is a schematic structural diagram of an apparatus for pressure calculation according to Embodiment XIII of the present disclosure.

FIG. 11 is a schematic structural diagram of an apparatus for pressure calculation according to Embodiment XIII of the present disclosure. As shown in FIG. 11, the apparatus for pressure calculation includes:

a data sampling unit 1101, configured to sample, within a preset sampling period, a phase-encoded driving signal that is continuously provided to obtain a sampled driving signal; and a pressure calculating unit 1102, configured to calculate pressure data within the sampling period according to a phase difference between adjacent frames of the sampled driving signal within the sampling period.

Figure 12:
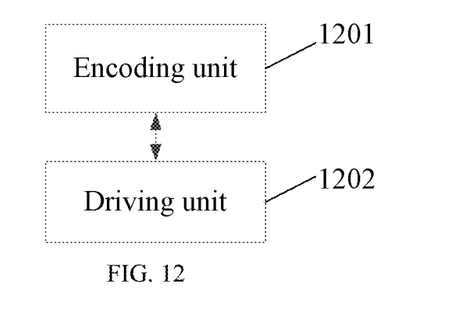
FIG. 12 is a schematic structural diagram of an apparatus for signal generation according to Embodiment XIV of the present disclosure.

FIG. 12 is a schematic structural diagram of an apparatus for signal generation according to Embodiment XIV of the present disclosure. As shown in FIG. 12, the apparatus for signal generation includes:

an encoding unit 1201, configured to perform phase encoding on a to-be-encoded driving signal to generate a driving signal; and a driving unit 1202, configured to continuously drive using the driving signal according to a preset driving period.

The driving signal is adapted to be sampled to obtain a sampled driving signal so as that pressure data within a sampling period is calculated according to a phase difference between adjacent frames of the sampled driving signal within the sampling period.

The embodiments of the present disclosure also provide an electronic device, which includes the apparatus for pressure calculation or the apparatus for signal generation according to any embodiment of the present disclosure.

Alternatively, in any embodiment of the present disclosure, the electronic device is the stylus, the apparatus for signal generation is arranged on the stylus, and correspondingly, the apparatus for pressure calculation is arranged on the touch screen. The electronic device also may be the touch screen, the apparatus for signal generation is arranged on the touch screen, and correspondingly, the apparatus for pressure calculation is arranged on the stylus.

Further, in the touch system according to the embodiments of the present disclosure, one of the stylus and the touch screen includes the apparatus for signal generation according to any embodiment of the present disclosure, and the other of the stylus and the touch screen includes the apparatus for pressure calculation according to any embodiment of the present disclosure.

It is to be noted that in other examples, the driving signal may only include a pressure driving signal. In this case, the sampled driving signal only includes sampled pressure signals, and the pressure data are calculated based on the phase difference between the sampled pressure signals. At the same time, if it is considered that the calculation of the touch location needs to be performed again, within one driving period, at least two frames of pressure driving signal are included, and correspondingly, within one sampling period, the sampled driving signal at least includes two frames of sampled pressure signal.

The electronic device in the embodiments of the present disclosure may exist in many forms, including but not limited to:

a. Mobile communication devices: characterized by having mobile communication functions and providing voice and data communications as main objectives. This type of terminals include: smart mobile phones (for example iPhone), multimedia mobile phones, feature phones and low-end mobile phones, etc.

b. Ultra-mobile personal computer equipment: belonging to the category of personal computers, having computing and processing functions, and generally having mobile Internet access characteristic. This type of terminals include: PDA, MID and UMPC devices or the like, for example iPad.

c. Portable entertainment devices: this type of devices can display and play back multimedia contents. This type of devices include: audio and video players (for example iPod), handheld game player, e-readers and intelligent toys and portable vehicle navigation devices.

d. Servers: devices providing computing services, including: processors, hard disks, memories and system buses or the like, the servers are similar to general-purpose computers in architecture, but needing to provide highly reliable services. Therefore, the servers are highly demanding in processing capacity, stability, reliability, security, extendibility, manageability and other aspects.

e. Other electronic apparatuses having data interaction functions.

Heretofore, particular embodiments of the subject matter have been described. Other embodiments are within the scope of the appended claims. In some cases, the actions recited in the claims can be performed in a different order and still achieve the desired results. In addition, the processes depicted in the figures are not necessarily in a particular order or a consecutive order to achieve the desired results. In some implementations, multitasking and parallel processing may be advantageous.

Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a merchandise or a device of these elements.

Cross reference is available for identical or similar parts among the embodiments of the specification, and a description of each embodiment is focused on difference from other embodiments.

The embodiments described above are only illustrated as embodiments of the present application, and are not intended to limit the present application. To those skilled in the art, various modifications and variations may be available for the present application. All modifications, equivalent substitutions and improvements made within the spirit and principle of the present application shall fall within the protection scope of the claims of the present application.

What is claimed is:

1. A method for pressure calculation, comprising:
sampling, within a preset sampling period, a driving signal that is generated by performing phase encoding on a to-be-encoded driving signal and is continuously provided to a touch screen to obtain a sampled driving signal, wherein a phase difference is provided between adjacent frames of the driving signal within each driving period according to a preset step phase when phase encoding is performed; and calculating pressure data within the sampling period according to a phase difference between adjacent frames of the sampled driving signal within the sampling period;
wherein the driving signal within one driving period comprises multiple frames of the driving signal, the multiple frames of the driving signal comprise n frames of a coordinate driving signal and m frames of a pressure driving signal, the n frames of the coordinate driving signal are continuous, and the m frames of the pressure driving signal are continuous, n is greater than or equal to 2, and m is greater than or equal to 0; and
the sampling, within a preset sampling period, a driving signal that is generated by performing phase encoding on a to-be-encoded driving signal and is continuously provided to a touch screen to obtain a sampled driving signal comprises: sampling, within the preset sampling period, the driving signal that is generated by performing phase encoding on the to-be-encoded driving signal and is continuously provided to the touch screen to obtain continuous n continuous frames of a sampled coordinate signal and continuous m frames of a sampled pressure signal, wherein the n frames of the sampled coordinate signal and the m frames of the sampled pressure signal constitute the sampled driving signal.

2. The method according to claim 1, wherein the calculating pressure data within the sampling period according to a phase difference between adjacent frames of the sampled driving signal within the sampling period comprises: calculating the pressure data within the sampling period according to the phase difference between the adjacent frames of the sampled driving signal within the sampling period and a pre-established pressure mapping relationship.

3. The method according to claim 2, further comprising: calculating a touch location according to the sampled driving signal.

4. The method according to claim 2, wherein in the pre-established pressure mapping relationship, for a step phase for setting a phase difference, different combinations of the phase difference between the adjacent frames within the sampling period represent different pressure grades.

5. The method according to claim 4, further comprising: calculating a touch location according to the sampled driving signal.

6. The method according to claim 4, wherein the step phase for the phase difference between two adjacent frames of the driving signal is any one of 45 degrees, 90 degrees, and 180 degrees.

7. The method according to claim 6, further comprising: calculating a touch location according to the sampled driving signal.

8. The method according to claim 4, wherein the step phase is constant within the same sampling period.

9. The method according to claim 1, the calculating pressure data within the sampling period according to a phase difference between adjacent frames of the sampled driving signal within the sampling period comprises: calculating the pressure data within the sampling period according to a phase difference between adjacent frames of the sampled coordinate signal among the n frames of the sampled coordinate signal within one sampling period, a phase difference between adjacent frames of the sampled pressure signal among the m frames of the sampled pressure signal within the one sampling period, and a phase difference between the sampled coordinate signal and the sampled pressure signal that are adjacent to one another among the n frames of the sampled coordinate signal and the m frames of the sampled pressure signal within the one sampling period.

10. The method according to claim 1, further comprising: calculating a touch location according to the sampled driving signal.

11. A method for signal generation, comprising:
performing phase encoding on a to-be-encoded driving signal to generate a driving signal, wherein a phase difference is provided between adjacent frames of the driving signal within each driving period according to a preset step phase when phase encoding is performed; and
continuously driving a touch screen using the driving signal according to a preset driving period;
wherein the driving signal is adapted to be sampled to obtain a sampled driving signal so as that pressure data within a sampling period is calculated according to a phase difference between adjacent frames of the sampled driving signal within the sampling period;
wherein the driving signal within one driving period comprises multiple frames of the driving signal, the multiple frames of the driving signal comprise n frames of a coordinate driving signal and m frames of a pressure driving signal, the n frames of the coordinate driving signal are continuous, and the m frames of the pressure driving signal are continuous, n is greater than or equal to 2, and m is greater than or equal to 0; and
the sampled driving signal with in the preset sampling period comprises continuous n continuous frames of a sampled coordinate signal and continuous m frames of a sampled pressure signal, wherein the n frames of the sampled coordinate signal and the m frames of the sampled pressure signal constitute the sampled driving signal.

12. The method according to claim 11, wherein a step phase for the phase difference between two adjacent frames of driving signal is any one of 45 degrees, 90 degrees, and 180 degrees.

13. The method according to claim 11, wherein the step phase is constant within the same driving period.

14. An electronic device, comprising an apparatus for pressure calculation or an apparatus for signal generation; wherein
the apparatus for signal generation comprising:
an encoding unit, configured to perform phase encoding on a to-be-encoded driving signal to generate a driving signal, wherein a phase difference is provided between adjacent frames of the driving signal within each driving period according to a preset step phase when phase encoding is performed; and
a driving unit, configured to continuously drive a touch screen using the driving signal according to a preset driving period;
wherein the driving signal is adapted to be sampled to obtain a sampled driving signal so as that pressure data within a sampling period is calculated according to a phase difference between adjacent frames of the sampled driving signal within the sampling period;
the apparatus for pressure calculation comprising:
a data sampling unit, configured to sample, within a preset sampling period, a driving signal that is generated by performing phase encoding on a to-be-encoded driving signal and is continuously provided to a touch screen to obtain a sampled driving signal, wherein a phase difference is provided between adjacent frames of the driving signal within each driving period according to a preset step phase when the phase encoding is performed; and
a pressure calculating unit, configured to calculate pressure data within the sampling period according to a phase difference between adjacent frames of the sampled driving signal within the sampling period;
wherein the driving signal within one driving period comprises multiple frames of the driving signal, the multiple frames of the driving signal comprise n frames of a coordinate driving signal and m frames of a pressure driving signal, the n frames of the coordinate driving signal are continuous, and the m frames of the pressure driving signal are continuous, n is greater than or equal to 2, and m is greater than or equal to 0; and
the data sampling unit, further configured to sample, within the preset sampling period, the driving signal that is generated by performing phase encoding on the to-be-encoded driving signal and is continuously provided to the touch screen to obtain continuous n continuous frames of a sampled coordinate signal and continuous m frames of a sampled pressure signal, wherein the n frames of the sampled coordinate signal and the m frames of the sampled pressure signal constitute the sampled driving signal.

15. The electronic device according to claim 14, wherein the electronic device is a stylus, the apparatus for signal generation is arranged on the stylus; and
correspondingly, the apparatus for pressure calculation is arranged on a touch screen.

* * * * *